United States Patent
Kim et al.

(10) Patent No.: US 8,606,100 B2
(45) Date of Patent: Dec. 10, 2013

(54) WDM-TDM PON REMOTE TERMINAL AND WDM-TDM PON LINK PROTECTION SYSTEM

(75) Inventors: Kwang-Ok Kim, Jeonju-si (KR); Eun-Gu Lee, Daejeon-si (KR); Eui-Suk Jung, Daejeon-si (KR); Sang-Soo Lee, Daejeon-si (KR); Tae-Whan Yoo, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 101 days.

(21) Appl. No.: 13/334,147

(22) Filed: Dec. 22, 2011

(65) Prior Publication Data

US 2012/0163802 A1    Jun. 28, 2012

(30) Foreign Application Priority Data

Dec. 22, 2010    (KR) ........................ 10-2010-0132525

(51) Int. Cl.
*G02F 1/00*    (2006.01)
(52) U.S. Cl.
USPC .......... 398/5; 398/2; 398/3; 398/177; 398/33; 398/17; 398/75; 398/68; 398/72; 398/71; 398/79; 370/352; 370/392; 370/389; 370/468
(58) Field of Classification Search
USPC ............. 398/1, 2, 3, 4, 5, 7, 8, 33, 38, 10, 17, 398/13, 20, 21, 66, 68, 70, 71, 72, 79, 69, 398/75, 98, 99, 100, 58, 173, 175, 176, 177, 398/180, 181; 370/352, 392, 389, 468, 465, 370/395.31, 395.41

See application file for complete search history.

(56) References Cited

U.S. PATENT DOCUMENTS

| | | | |
|---|---|---|---|
| 2009/0169200 A1* | 7/2009 | Li et al. | 398/7 |
| 2009/0290866 A1* | 11/2009 | Chung et al. | 398/5 |
| 2010/0098407 A1 | 4/2010 | Goswami et al. | |

FOREIGN PATENT DOCUMENTS

| | | |
|---|---|---|
| KR | 10-0732587 | 6/2007 |
| KR | 10-2008-0089089 | 10/2008 |
| KR | 10-0947711 | 3/2010 |

\* cited by examiner

*Primary Examiner* — Hanh Phan
(74) *Attorney, Agent, or Firm* — Rabin & Berdo, P.C.

(57) ABSTRACT

A wavelength division multiplexing (WDM)-time division multiplexing (TDM) passive optical network (PON) remote terminal (RT) is provided. The wavelength division multiplexing (WDM)-time division multiplexing (TDM) passive optical network (PON) remote terminal (RT), includes: a WDM-TDM converter configured to convert a WDM downstream optical signal that is received from a central office terminal (COT) into a TDM downstream optical signal or to convert a TDM upstream optical signal that is received from an optical network terminal (ONT) into a WDM upstream optical signal; an error detector configured to detect an error; and a controller configured to, in response to an error being detected, transmit the WDM upstream optical signal to the COT via a first standby link or transmit the TDM downstream optical signal to the ONT via a second standby link.

14 Claims, 5 Drawing Sheets

WDM-TDM PON REMOTE TERMINAL AND WDM-TDM PON LINK PROTECTION SYSTEM

CROSS-REFERENCE TO RELATED APPLICATION(S)

This application claims the benefit under 35 U.S.C. §119(a) of Korean Patent Application No. 10-2010-0132525, filed on Dec. 22, 2010, in the Korean Intellectual Property Office, the entire disclosure of which is incorporated herein by reference for all purposes.

BACKGROUND

1. Field

The following description relates to a technique to offer high-speed link protection switching from an erroneous link to a standby link in a passive optical network (PON) into which wavelength division multiplexing (WDM) and time division multiple access (TDMA) are combined.

2. Description of the Related Art

Passive optical networks (PONs) are largely classified into a time division multiplexing (TDM)-PON and a wavelength division multiplexing (WDM)-PON. Examples of the WDM-PON include an Ethernet PON (EPON) and a Gigabit PON (GPON). The WDM-PON allows multiple subscribers to share bandwidth in time domains. Accordingly, the more subscribers, the less the bandwidth available. In order to address this problem, the TDM-PON uses N times more optical fibers and equipment than the WDM-PON. The WDM-PON uses different wavelengths for a single optical fiber, and allocates the different wavelengths to each subscriber, thereby addressing the bandwidth problem of the TDM-PON. However, since there are not yet many services that use such broad bandwidth, the WDM-PON may suffer from low efficiency of bandwidth utilization.

A WDM-TDM PON, which is also referred to as a hybrid PON, is a combination of the WDM-PON and the TDM-PON and offers the advantages of both the WDM-PON and the TDM-PON. More specifically, the WDM-TDM PON integrates a typical TDM-PON backbone relay network with a WDM-PON technology, and provides various advantages, such as 3 times longer transmission distances, 2 times higher split ratios, and 32 times larger link capacity, compared to a typical TDM-PON. However, such a long transmission distance and concentrated link capacity may increase the probability of link malfunction, and may require protection switching.

The WDM-TDM PON uses and is highly dependent on long optical fibers. Accordingly, a technique is needed to perform high-speed switching between optical fibers.

SUMMARY

In one general aspect, a wavelength division multiplexing (WDM)-time division multiplexing (TDM) passive optical network (PON) remote terminal (RT), including: a WDM-TDM converter configured to convert a WDM downstream optical signal that is received from a central office terminal (COT) into a TDM downstream optical signal or to convert a TDM upstream optical signal that is received from an optical network terminal (ONT) into a WDM upstream optical signal; an error detector configured to detect an error; and a controller configured to, in response to an error being detected, transmit the WDM upstream optical signal to the COT via a first standby link or transmit the TDM downstream optical signal to the ONT via a second standby link.

The WDM-TDM converter may be further configured to receive the WDM downstream optical signal via a first main link and the first standby link that are connected to the COT.

The WDM-TDM converter may be further configured to receive the TDM upstream optical signal via a second main link and the second standby link that are connected to the ONT.

The error detector may be further configured to receive the WDM downstream optical signal via a first main link that is connected to the COT and to detect an error based on the WDM downstream optical signal.

The error detector may be further configured to receive the TDM upstream optical signal via a second main link that is connected to the COT and to detect an error based on the TDM upstream optical signal.

The error detector may be further configured to detect an error based on loss-of-signal (LOS) information, loss-of-frame (LOF) information, signal fail (SF) information, signal degrade (SD) information, and transmitter fail (TF) information.

The controller may be further configured to, in response to no error being detected, transmit the WDM upstream optical signal to the COT via a first main link or transmit the TDM downstream optical signal to the ONT via a second main link.

The controller may be further configured to transmit error detection information to a remote management unit.

The controller may be further configured to transmit the error detection information to the remote management unit using a simple network management protocol (SNMP).

The WDM-TDM PON RT may further include a multiplexing/demultiplexing unit configured to multiplex the WDM downstream optical signal or demultiplex WDM upstream optical signal.

In another general aspect, there is provided a WDM-TDM PON RT including: a WDM-TDM converter configured to convert a WDM downstream optical signal that is received from a COT into a TDM downstream optical signal or to convert a TDM upstream optical signal that is received from an ONT into a WDM upstream optical signal; an error detector configured to detect an error; and a controller configured to, in response to an error being detected, transmit the WDM upstream optical signal to the COT via the optical fiber using a first standby wavelength or transmit the TDM downstream optical signal to the ONT via a standby link, wherein the first standby link is an odd wavelength.

The controller may be further configured to, in response to no error being detected, transmit the WDM upstream optical signal to the COT via the optical fiber using a first active wavelength and the first active wavelength is an even wavelength.

The WDM-TDM converter may be further configured to receive the TDM upstream optical signal via a main link and the standby link and the main link and the standby link are connected to the ONT.

In another general aspect, there is provided a WDM-TDM PON link protection system, including: a COT configured to convert a downstream optical signal that is received from an optical line terminal (OLT) into a WDM downstream optical signal and to transmit the WDM downstream optical signal via a first main link and a first standby link; a WDM-TDM RT configured to include a WDM-TDM converter configured to convert the WDM downstream optical signal into a TDM downstream optical signal or to convert a TDM upstream optical signal that is received from an ONT into a WDM upstream optical signal, an error detector configured to detect an error, and a controller configured to, in response to an error being detected, transmit the WDM upstream optical signal to the COT via a first standby link or transmit the TDM downstream optical signal to the ONT via a second standby link; and a splitter configured to receive the TDM upstream optical signal from the WDM-TDM RT, split the TDM upstream optical signal, and transmit the split TDM upstream optical signal to the ONT or to receive the TDM upstream optical signal from the ONT and transmit the TDM upstream optical signal to the WDM-TDM RT.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
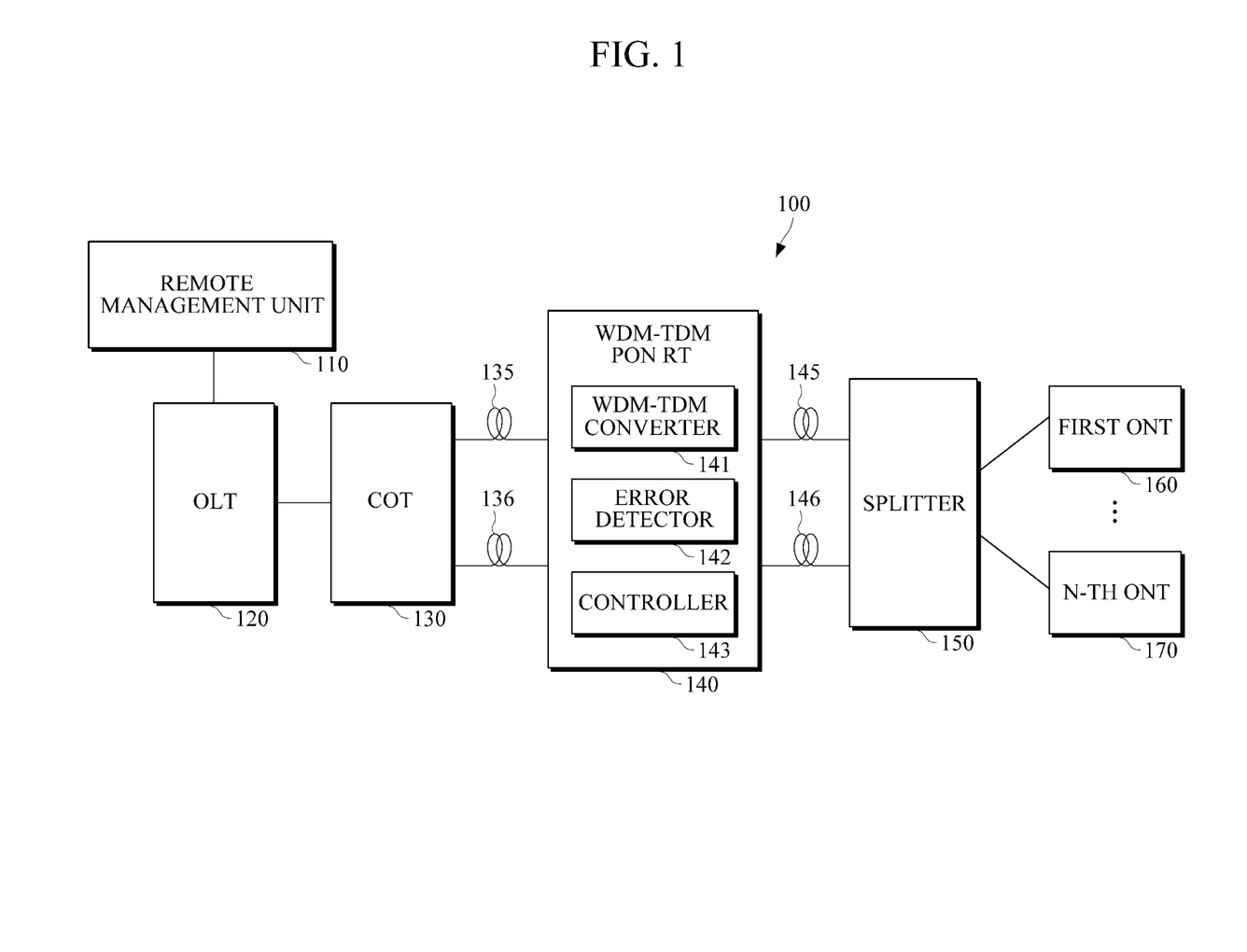
FIG. 1 is a diagram illustrating an example of a wavelength division multiplexing (WDM)-time division multiplexing (TDM) passive optical network (PON) system.

FIG. 1 illustrates an example of a wavelength division multiplexing (WDM)-time division multiplexing (TDM) passive optical network (PON) system.

Referring to FIG. 1, WDM-TDM PON system 100 includes a remote management unit 110, an optical line terminal (OLT) 120, a central office terminal (COT) 130, a first main link 135, a first standby link 136, a WDM-TDM PON remote terminal (RT) 140, a second main link 145, a second standby link 146, a splitter 150, and first and N-th optical network terminals (ONTs) 160 and 170.

For example, the remote management unit 110, the OLT 120, the COT 130 may be provided in a service provider. For example, the WDM-TDM PON RT 140 may be provided between the service provider and the first and N-th ONTs 160 and 170.

The remote management unit 110 may manage the transmission or receipt of an optical signal.

The OLT 120 may generate an optical signal, and may transmit the optical signal to the COT 130. For example, the OLT 120 may be a multi-service device that connects an optical subscriber network to a predetermined system, and may include a Service Interface and Protocol Processing (SIPP) device, a cable TV set, a transmitter and a network management device.

The COT 130 may receive a downstream optical signal from the OLT 120 and may convert the downstream optical signal into a WDM downstream optical signal. For example, the term 'downstream optical signal' indicates an optical signal that is transmitted to the first and N-th ONTs 160 and 170 via the COT 130 and the WDM-TDM PON RT 140. The COT 130 may transmit the WDM downstream optical signal via both the first main link 135 and the first standby link 136. For example, the COT 130 may include a switch (not shown), a first WDM optical transmitter (not shown) and a second WDM optical transmitter (not shown). The COT 130 may transmit the WDM downstream optical signal to the WDM-TDM PON RT 140 via the first WDM optical transmitter and the first main link 135 and via the second WDM optical transmitter and the first standby link 136. The COT 130 may control the switch to control the path of transmission or receipt of an optical signal.

For example, the first main link 135 may be an optical fiber for transmitting a downstream optical signal when there is no error detected, and the first standby link 136 may be an optical fiber for transmitting a downstream optical signal when there is an error detected.

The COT 130 may transmit a WDM upstream optical signal that is received via one of the first main link 135 and the first standby link 136 to the OLT 120. For example, the term 'upstream optical signal' indicates an optical signal that is transmitted to the OLT 120 via the WDM-TDM PON RT 140 and the COT 130.

For example, the first main link 135 may be an optical fiber for transmitting an upstream optical signal when there is no error detected, and the first standby link 136 may be an optical fiber for transmitting an upstream optical signal when there is an error detected. In another example, the first main link 135 may be used to transmit an upstream optical signal when there is an error detected, and the first standby link 136 may be used to transmit an upstream optical signal when there is no error detected.

The WDM-TDM PON RT 140 includes a WDM-TDM converter 141, an error detector 142, and a controller 143.

The WDM-TDM PON RT 140 may receive a WDM downstream optical signal via the first main link 135 and the first standby link 136 that are connected to the OLT 120.

The WDM-TDM PON RT 140 may transmit a WDM downstream optical signal via one of the second main link 145 and the second standby link 146.

The WDM-TDM PON RT 140 may receive a TDM upstream optical signal via the second main link 145 and the second standby link 146 that are connected to the first and N-th ONTs 160 and 170.

The WDM-TDM PON RT 140 may transmit a TDM upstream optical signal via one of the first main link 135 and the first standby link 136.

The WDM-TDM converter 141 may receive a WDM downstream optical signal from the COT 130, and may convert the received WDM downstream optical signal into a TDM downstream optical signal. For example, the WDM-TDM converter 141 may convert the received WDM downstream optical signal into a TDM downstream optical signal using optical-to-electrical-to-optical (OEO) method.

The WDM-TDM converter 141 may receive a TDM upstream optical signal from the first and N-th ONTs 160 and 170, and may convert the received TDM upstream optical signal into a WDM upstream optical signal.

The error detector 142 may detect an error. For example, the error detector 142 may detect an error based on loss-of-signal (LOS) Information, loss-of-frame (LOF) information, signal fail (SF) Information, bit interleaved parity (BIP) information, signal degrade (SD) information, and transmitter fail (TF) information. For example, the error detector 142 may extract LOS information, LOF information, SF information, BIP information, SD information, and TF information from a WDM downstream optical signal that is received via the first main link 135 or a TDM upstream optical signal that is received via the second main link 145, and may detect an error based on the extracted information. An example of detecting an error is further described with reference to FIG. 5.

In a case in which the error detector 142 detects an error from the first main link 135 based on a WDM downstream optical signal that is received via the first main link 135, the controller 143 may transmit the WDM downstream optical signal to the OLT 130 via the first standby link 136. In a case in which the error detector 142 detects an error from the second main link 145 based on a TDM upstream optical signal that is received via the second main link 145, the controller 143 may transmit the TDM upstream optical signal to the splitter 150 via the second standby link 146. In response to an error being detected, the controller 143 may switch from one optical fiber to another optical fiber.

In a case in which the error detector 142 detects no error from the first main link 135 based on a WDM downstream optical signal that is received via the first main link 135, the controller 143 may transmit the WDM downstream optical signal to the OLT 130 via the first main link 135.

In a case in which the error detector 142 detects no error from the second main link 145 based on a TDM upstream optical signal that is received via the second main link 145, the controller 143 may transmit the TDM upstream optical signal to the splitter 150 via the second main link 145. In a case in which no error is detected, the controller 143 may continue to use a current optical fiber.

The controller 143 may transmit error detection information that indicates whether an error has been detected to the remote management unit 110. For example, the controller 143 may transmit the error detection information to the remote management unit 110 using a simple network management protocol (SNMP). The remote management unit 110 may manage the transmission or receipt of an optical signal based on the error detection information.

For example, the second main link 145 may be an optical fiber for transmitting or receiving an optical signal when there is no error detected, and the second standby main link 146 may be an optical fiber for transmitting or receiving an optical signal when there is an error detected. In another example, the second main link 145 may be used to transmit or receive an optical signal when there is an error detected, and the second standby link 146 may be used to transmit or receive an optical signal when there is no error detected.

The splitter 150 may receive a TDM downstream optical signal from the WDM-TDM PON RT 140, may split the received TDM downstream optical signal, and may transmit the split TDM downstream optical signal to the first and N-th ONTs 160 and 170. The splitter 150 may receive a TDM upstream optical signal from the first and N-th ONTs 160 and 170, and may transmit the TDM upstream optical signal to the WDM-TDM PON RT 140. For example, the splitter 150 may be a 2:N splitter.

The first and N-th ONTs 160 and 170 may be installed on a user's side or may be installed in user equipment to access an optical subscriber network. The first and N-th ONTs 160 and 170 may access an optical fiber network using a communication interface such as a Narrowband-Integrated Services Digital Network (N-ISDN) user-network interface, a Broadband-Integrated Services Digital Network (B-ISDN) user-network interface or the like or an image signal interface.

The WDM-TDM PON system 100 may also include a WDM multiplexing/demultiplexing unit (not shown). The WDM multiplexing/demultiplexing unit may be provided between the COT 130 and the WDM-TDM PON RT 140. The WDM multiplexing/demultiplexing unit may multiplex or demultiplex an optical signal, and may output the multiplexed or demultiplexed optical signal.

According to the example illustrated in FIG. 1, it is possible to provide an RT capable of offering a high-speed link protection switching function for service providers' links and subscribers' links, and to seamlessly transmit or receive optical signals.

In addition, it is possible to install an RT without any modification to existing TDM PON equipment.

Moreover, it is possible to perform link protection switching for each wavelength available for use in WDM.

Figure 2:
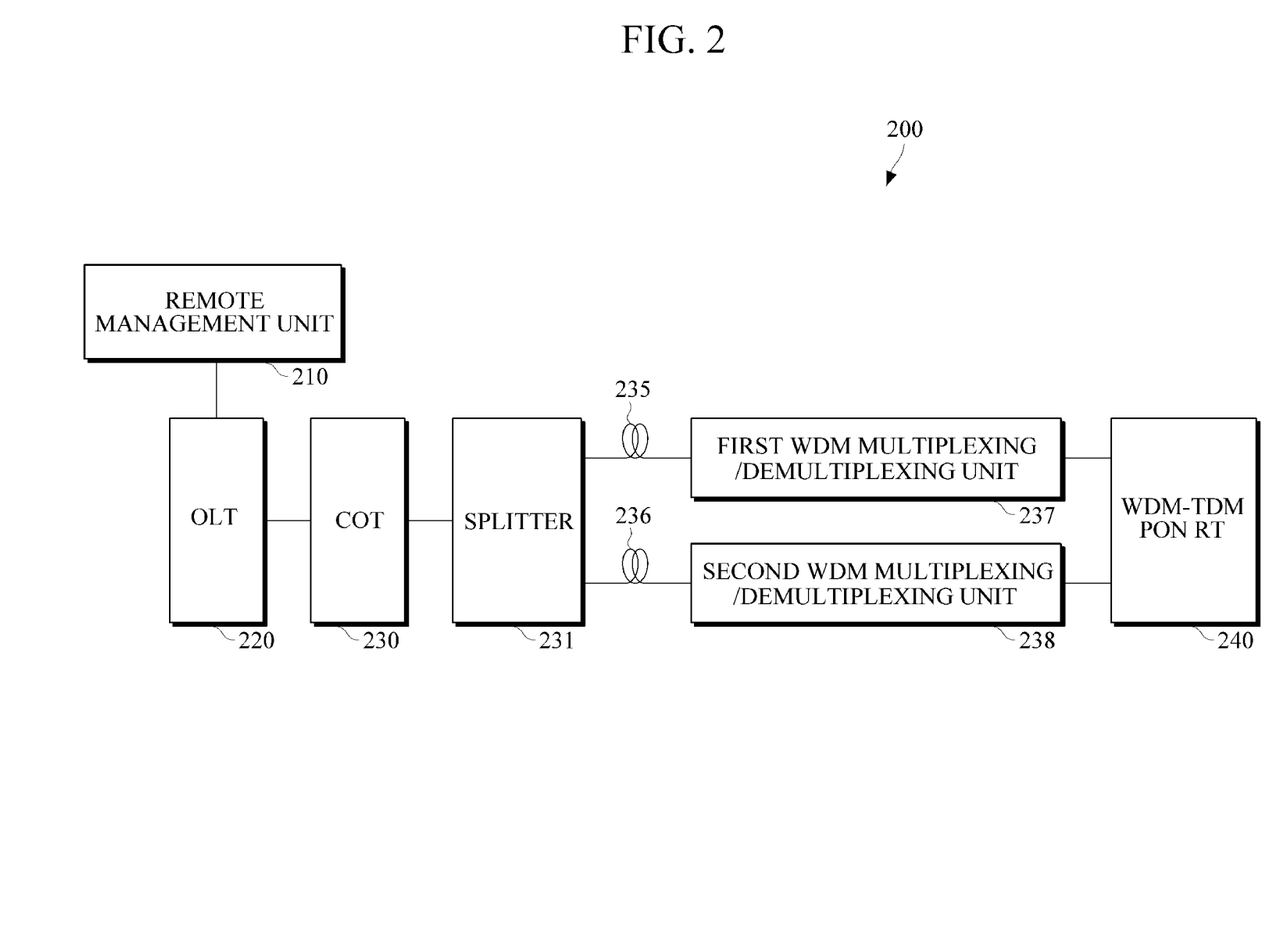
FIG. 2 is a diagram illustrating another example of a WDM-TDM PON system.

FIG. 2 illustrates another example of a WDM-TDM PON system.

Referring to FIG. 2, WDM-TDM PON system 200 includes a remote management unit 210, an OLT 220, a COT 230, a splitter 231, a first main link 235, a first standby link 236, a first WDM multiplexing/demultiplexing unit 237, a second WDM multiplexing/demultiplexing unit 238, and a WDM-TDM PON RT 240.

The remote management unit 210 may manage the transmission or receipt of an optical signal.

The OLT 220 may generate an optical signal, and may transmit the optical signal to the COT 130.

The COT 230 may receive a downstream optical signal from the OLT 220 and may convert the downstream optical signal into a WDM downstream optical signal. The COT 130 may transmit the WDM downstream optical signal to the splitter 231.

The splitter 231 may split the WDM downstream optical signal, and may transmit the split WDM downstream optical signal to the first and second WDM multiplexing/demultiplexing units 237 and 238.

The splitter 231 may transmit a WDM upstream optical signal that is received via one of the first main link 235 and the first standby link 236 to the COT 230.

For example, the first main link 235 may be an optical fiber for transmitting or receiving an optical signal when there is no error detected, and the first standby link 236 may be an optical fiber for transmitting or receiving an optical signal when there is an error detected. In another example, the first main link 235 may be used to transmit or receive an optical signal when there is an error detected, and the first standby link 236 may be used to transmit or receive an optical signal when there is no error detected.

The first WDM multiplexing/demultiplexing unit 237 may multiplex a WDM downstream optical signal that is received via the first main link 235, and may transmit the multiplexed WDM downstream optical signal to the WDM-TDM PON RT 240. The first WDM multiplexing/demultiplexing unit 237 may demultiplex a WDM upstream optical signal that is received from the WDM-TDM PON RT 240, and may transmit the demultiplexed WDM upstream optical signal to the splitter 231 via the first main link 235.

The second WDM multiplexing/demultiplexing unit 238 may multiplex a WDM downstream optical signal that is received via the first standby link 236, and may transmit the multiplexed WDM downstream optical signal to the WDM-TDM PON RT 240. The first WDM multiplexing/demultiplexing unit 237 may demultiplex a WDM upstream optical signal that is received from the WDM-TDM PON RT 240, and may transmit the demultiplexed WDM upstream optical signal to the splitter 231 via the first standby link 236.

The first and second WDM multiplexing/demultiplexing units 237 and 238 may be provided in the WDM-TDM PON RT 240.

For example, the COT 230 may include a switch (not shown), a first WDM optical transceiver (not shown), and a second WDM optical transceiver (not shown). The COT 230 may transmit a WDM downstream optical signal to the WDM-TDM PON RT 240 via the first WDM transceiver and the first main link 235 and via the second WDM transceiver and the first standby link 236. The COT 230 may control the switch to control the path of transmission or receipt of an optical signal. In this example, the splitter 231 may be optional.

According to the example illustrated in FIG. 2, it is possible for a WDM-TDM PON system to split an optical signal that is extracted from a COT by using a splitter.

Figure 3:
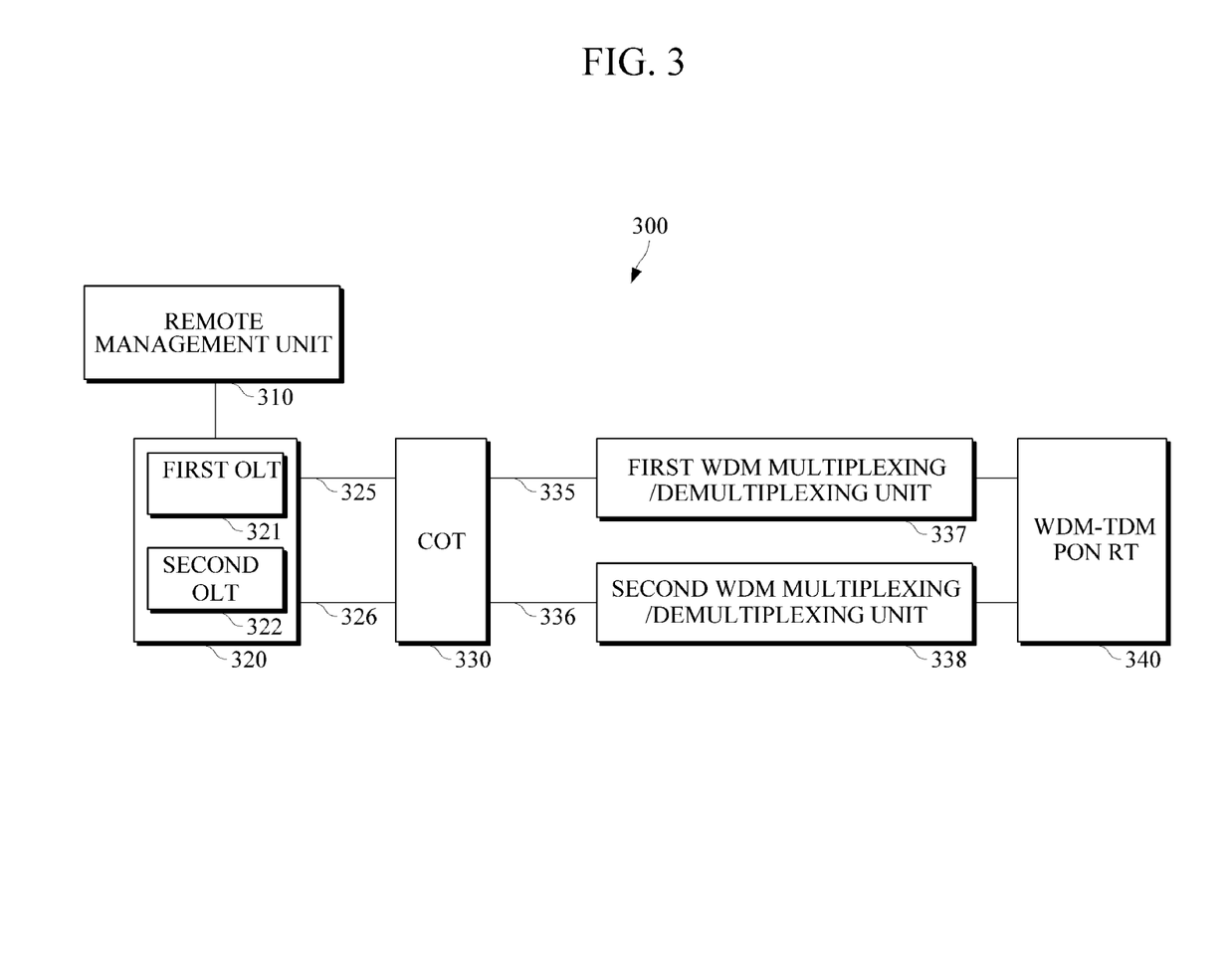
FIG. 3 is a diagram illustrating another example of a WDM-TDM PON system.

FIG. 3 illustrates another example of a WDM-TDM PON system.

Referring to FIG. 3, WDM-TDM PON system 300 includes a remote management unit 310, an OLT 320, a COT 330, a first main link 335, a first standby link 336, a first WDM multiplexing/demultiplexing unit 337, a second WDM multiplexing/demultiplexing unit 338, and a WDM-TDM PON RT 340.

The remote management unit 310 may manage the transmission or receipt of an optical signal.

The OLT 320 may generate an optical signal, and may transmit the optical signal to the COT 330. The OLT 320 may include a first OLT 321 and a second OLT 322.

In a case in which no error occurs on the first main link 325, an optical signal generated by the first OLT 321 may be transmitted to the COT 330 via the first main link 325.

On the other hand, in a case in which an error occurs on the first main link 325, an optical signal generated by the second OLT 322 may be transmitted to the COT 330 via the second link 326. Accordingly, by using two OLTs, it is possible to properly protect the first main link 325.

The COT 330 may convert a downstream optical signal that is received from the OLT 320 into a WDM downstream optical signal. The COT 330 may transmit the WDM downstream optical signal to the first and second WDM multiplexing/demultiplexing units 337 and 338 at the same time. For example, the COT 330 may receive a downstream optical signal from two WDM optical receivers (not shown), may convert the received downstream optical signal into a WDM downstream optical signal, and may transmit the WDM downstream optical signal to the first and second WDM multiplexing/demultiplexing units 337 and 338.

For example, the second main link 335 may be an optical fiber for transmitting or receiving an optical signal when there is no error detected, and the second standby link 336 may be an optical fiber for transmitting or receiving an optical signal when there is an error detected. In another example, the second main link 335 may be used to transmit or receive an optical signal when there is an error detected, and the second standby link 336 may be used to transmit or receive an optical signal when there is no error detected.

The first WDM multiplexing/demultiplexing unit 337 may multiplex a WDM downstream optical signal that is received via the first main link 335, and may transmit the multiplexed WDM downstream optical signal to the WDM-TDM PON RT 340. The first WDM multiplexing/demultiplexing unit 337 may demultiplex a WDM upstream optical signal that is received from the WDM-TDM PON RT 340, and may transmit the demultiplexed WDM upstream optical signal to the COT 330 via the first main link 335.

The second WDM multiplexing/demultiplexing unit 338 may multiplex a WDM downstream optical signal that is received via the first standby link 336, and may transmit the multiplexed WDM downstream optical signal to the WDM-TDM PON RT 340. The second WDM multiplexing/demultiplexing unit 338 may demultiplex a WDM upstream optical signal that is received from the WDM-TDM PON RT 340, and may transmit the demultiplexed WDM upstream optical signal to the COT 330 via the first standby link 336.

The first and second WDM multiplexing/demultiplexing units 337 and 338 may be provided in the WDM-TDM PON RT 340.

In the example illustrated in FIG. 3, by duplicating an OLT, it is possible for a WDM-TDM PON system to efficiently perform link protection switching.

Figure 4:
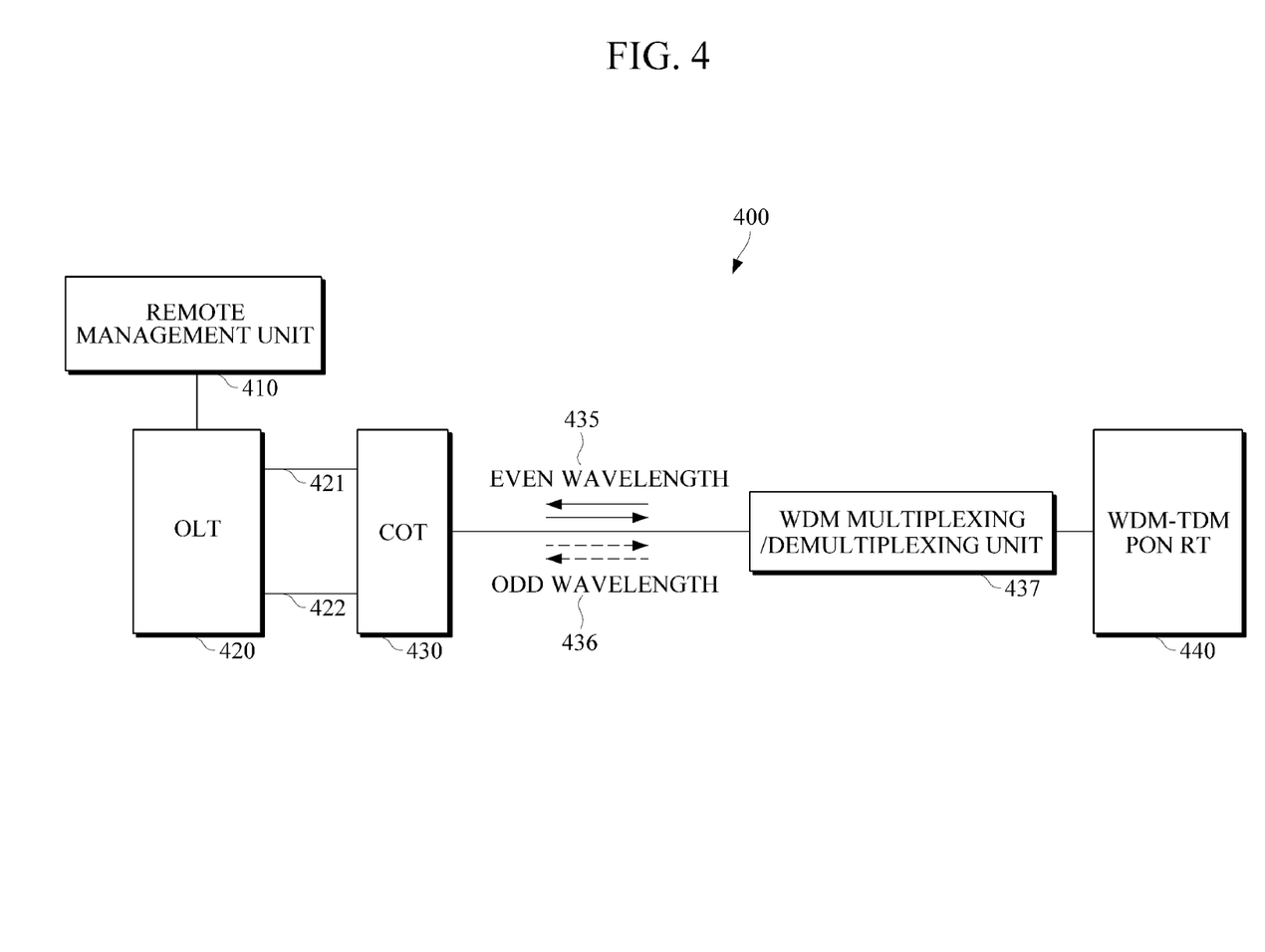
FIG. 4 is a diagram illustrating another example of a WDM-TDM PON system.

FIG. 4 illustrates another example of a WDM-TDM PON system.

Referring to FIG. 4, WDM-TDM PON system 400 includes a remote management unit 410, an OLT 420, a COT 430, optical fibers 435 and 436, a WDM multiplexing/demultiplexing unit 437, and a WDM-TDM PON RT 440.

The remote management unit 410 may manage the transmission or receipt of an optical signal.

The OLT 420 may generate an optical signal, and may transmit the optical signal to the COT 430 via a main link 421 and a standby link 422. For example, the OLT 420 may transmit an optical signal with an even wavelength to the COT 430 via the main link 421, and may transmit an optical signal with an odd wavelength to the COT 430 via the standby link 422.

In a case in which no error occurs on the main link 421, the OLT 420 may transmit an optical signal to the COT 430 via the main link 421.

On the other hand, in a case in which an error occurs on the main link 421, the OLT 420 may transmit an optical signal to the COT 430 via the standby link 422.

The COT 430 may convert a downstream optical signal that is received via the main link 421 and the standby link 422 into a WDM downstream optical signal. For example, the COT 430 may transmit an optical signal that is received via the main link 421 to the WDM multiplexing/demultiplexing unit 437 using an active wavelength. For example, the COT 430 may transmit an optical signal that is received via the standby link 421 to the WDM multiplexing/demultiplexing unit 437 using a standby wavelength. For example, an even wavelength 435 may be set as an active wavelength, and an odd wavelength 436 may be set as a standby wavelength. In another example, the odd wavelength 436 may be set as the active wavelength, and the even wavelength 435 may be set as the standby wavelength.

The WDM multiplexing/demultiplexing unit 437 may multiplex a WDM downstream optical signal that is received via the optical fibers 435 and 436, and may transmit the multiplexed WDM downstream optical signal to the WDM-TDM PON RT 440. The WDM multiplexing/demultiplexing unit 437 may demultiplex a WDM upstream optical signal that is received from the WDM-TDM PON RT 440, and may transmit the demultiplexed WDM upstream optical signal to the COT 430.

The WDM multiplexing/demultiplexing unit 437 may be provided in the WDM-TDM PON RT 440.

In response to there being no error detected, the WDM-TDM PON RT 440 may transmit a WDM optical signal to the OLT 430 via the optical fibers 435 and 436 using the active wavelength. On the other hand, in response to there being an error detected, the WDM-TDM PON RT 440 may transmit a WDM optical signal to the OLT 430 via the optical fibers using the standby wavelength.

According to the example illustrated in FIG. 4, it is possible to simplify the structure of a WDM-TDM PON system and reduce the manufacturing cost of a WDM-TDM PON system by adopting WDM-based link protection switching.

Figure 5:
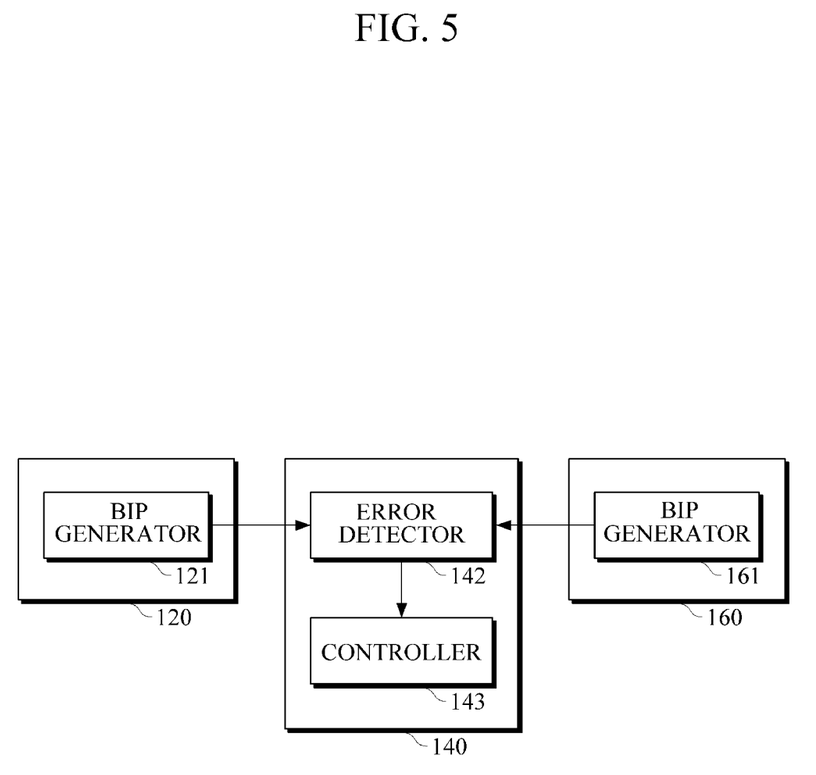
FIG. 5 is a diagram illustrating an example of an error detection operation performed by a WDM-TDM remote terminal (RT) illustrated in FIG. 1.

FIG. 5 illustrates an example of an error detection operation performed by the WDM-TDM PON RT 140 illustrated in FIG. 1.

Referring to FIGS. 1 and 5, the OLT 120 includes a BIP generator 121 that generates a BIP value. The OLT 120 may insert the BIP value in a frame, and may transmit the frame to the WDM-TDM PON RT 140. The WDM-TDM PON RT 140 includes an error detector 142. The error detector 142 may receive the frame from the OLT 120, and may extract a BIP error value based on the BIP value included in the received frame. The error detector 142 may detect SF information or SD information based on the BIP error value. For example, the error detector 142 may detect SD information or SD information based on BIP errors that occur during a predetermined period of time.

LOF information may be detected when there is a frame synchronization failure. LOS information may be received from an optical transceiver (not shown) that performs wavelength division. LOS information may be detected for each wavelength. TF information may be detected when there is a transmission failure.

Switching for a link of a backbone relay network is described. For example, the WDM-TDM PON RT 140 may determine whether an error has occurred. In response to LOS information, LOF information, SF information, and the like indicating that there is no error detected, the WDM-TDM PON RT 140 may continue to perform a current operation. On the other hand, in response to LOS information, LOF information, SF information, and the like indicating that there is an error detected, the WDM-TDM PON RT 140 may perform switching.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wavelength division multiplexing (WDM)-time division multiplexing (TDM) passive optical network (PON) remote terminal (RT), comprising:
  a WDM-TDM converter configured to convert a WDM downstream optical signal that is received from a central office terminal (COT) into a TDM downstream optical signal or to convert a TDM upstream optical signal that is received from an optical network terminal (ONT) into a WDM upstream optical signal;
  an error detector configured to detect an error; and
  a controller configured to, in response to an error being detected, transmit the WDM upstream optical signal to the COT via a first standby link or transmit the TDM downstream optical signal to the ONT via a second standby link.

2. The WDM-TDM PON RT of claim 1, wherein the WDM-TDM converter is further configured to receive the WDM downstream optical signal via a first main link and the first standby link that are connected to the COT.

3. The WDM-TDM PON RT of claim 1, wherein the WDM-TDM converter is further configured to receive the TDM upstream optical signal via a second main link and the second standby link that are connected to the ONT.

4. The WDM-TDM PON RT of claim 1, wherein the error detector is further configured to receive the WDM downstream optical signal via a first main link that is connected to the COT and to detect an error based on the WDM downstream optical signal.

5. The WDM-TDM PON RT of claim 1, wherein the error detector is further configured to receive the TDM upstream optical signal via a second main link that is connected to the COT and to detect an error based on the TDM upstream optical signal.

6. The WDM-TDM PON RT of claim 1, wherein the error detector is further configured to detect an error based on loss-of-signal (LOS) information, loss-of-frame (LOF) information, signal fail (SF) information, signal degrade (SD) information, and transmitter fail (TF) information.

7. The WDM-TDM PON RT of claim 1, wherein the controller is further configured to, in response to no error being detected, transmit the WDM upstream optical signal to the COT via a first main link or transmit the TDM downstream optical signal to the ONT via a second main link.

8. The WDM-TDM PON RT of claim 1, wherein the controller is further configured to transmit error detection information to a remote management unit.

9. The WDM-TDM PON RT of claim 8, wherein the controller is further configured to transmit the error detection information to the remote management unit using a simple network management protocol (SNMP).

10. The WDM-TDM PON RT of claim 1, further comprising:
  a multiplexing/demultiplexing unit configured to multiplex the WDM downstream optical signal or demultiplex WDM upstream optical signal.

11. A wavelength division multiplexing (WDM)-time division multiplexing (TDM) passive optical network (PON) remote terminal (RT), comprising:
- a WDM-TDM converter configured to convert a WDM downstream optical signal that is received from a central office terminal (COT) into a TDM downstream optical signal or to convert a TDM upstream optical signal that is received from an optical network terminal (ONT) into a WDM upstream optical signal;
- an error detector configured to detect an error; and
- a controller configured to, in response to an error being detected, transmit the WDM upstream optical signal to the COT via an optical fiber using a first standby wavelength or transmit the TDM downstream optical signal to the ONT via a standby link, wherein the first standby wavelength is an odd wavelength.

12. The WDM-TDM PON RT of claim 11, wherein the controller is further configured to, in response to no error being detected, transmit the WDM upstream optical signal to the COT via the optical fiber using a first active wavelength and the first active wavelength is an even wavelength.

13. The WDM-TDM PON RT of claim 11, wherein the WDM-TDM converter is further configured to receive the TDM upstream optical signal via a main link and the standby link, and the main link and the standby link are connected to the ONT.

14. A wavelength division multiplexing (WDM)-time division multiplexing (TDM) passive optical network (PON) remote terminal (RT) link protection system, comprising:
- a central office terminal (COT) configured to convert a downstream optical signal that is received from an optical line terminal (OLT) into a WDM downstream optical signal and to transmit the WDM downstream optical signal via a first main link and a first standby link;
- a WDM-TDM RT configured to include a WDM-TDM converter, which is configured to convert the WDM downstream optical signal into a TDM downstream optical signal or to convert a TDM upstream optical signal that is received from an optical network terminal (ONT) into a WDM upstream optical signal, an error detector configured to detect an error, and a controller configured to, in response to an error being detected, transmit the WDM upstream optical signal to the COT via the first standby link or transmit the TDM downstream optical signal to the ONT via a second standby link; and
- a splitter configured to receive the TDM downstream optical signal from the WDM-TDM RT, split the TDM downstream optical signal, and transmit the split TDM downstream optical signal to the ONT or to receive the TDM upstream optical signal from the ONT and transmit the TDM upstream optical signal to the WDM-TDM RT.

\* \* \* \* \*